United States Patent [19]

Clarke

[11] Patent Number: 5,160,248
[45] Date of Patent: Nov. 3, 1992

[54] FAN CASE LINER FOR A GAS TURBINE ENGINE WITH IMPROVED FOREIGN BODY IMPACT RESISTANCE

[75] Inventor: Jonathan P. Clarke, West Chester, Ohio

[73] Assignee: General Electric Company, Cincinnati, Ohio

[21] Appl. No.: 660,302

[22] Filed: Feb. 25, 1991

[51] Int. Cl.$^5$ ............................................. F01D 21/00
[52] U.S. Cl. ........................................ 415/9; 415/119; 29/458; 29/889.2; 156/276; 156/292; 428/117
[58] Field of Search ................ 415/9, 119, 196, 197, 415/200; 29/888, 889.2, 458, 469, 527.1, 527.2; 156/276, 292; 428/116, 117, 118

[56] References Cited

U.S. PATENT DOCUMENTS

| | | | |
|---|---|---|---|
| 3,948,346 | 4/1976 | Schindler | 428/116 |
| 4,534,698 | 8/1985 | Tomich | 415/9 |

FOREIGN PATENT DOCUMENTS

| | | | |
|---|---|---|---|
| 0030179 | 6/1981 | European Pat. Off. | 415/196 |
| 0296067 | 12/1988 | European Pat. Off. | 428/116 |
| 2317504 | 6/1976 | France | 415/119 |

OTHER PUBLICATIONS

Rolls-Royce, RB 211-535 E4 Fan Case Lining, Jun. 11, 1986, p. 5, Figure 2.6.

*Primary Examiner*—Edward K. Look
*Assistant Examiner*—Christopher M. Verider
*Attorney, Agent, or Firm*—Charles L. Moore, Jr.; Jerome C. Squillaro

[57] ABSTRACT

A fan case liner for a gas turbine engine includes a foreign body impact resistant area and a sound suppression area. The foreign body impact resistant area includes a face sheet of a high impact resistant material which substantially resists denting when struck by a foreign body. A first honeycombed layer of aluminum or an aluminum alloy is disposed over and attached to the face sheet. The first layer has a selected compressive strength to distribute loading forces caused by the impact of a foreign body and to resist plastic deformation. The hexagonally shaped voids in the honeycombed structure of the first layer are filled with a microballoon/resin filler material to further improve resistance to damage or denting. At least one second honeycombed layer of a aluminum or an aluminum alloy is disposed over and attached to the first honeycombed layer. The at least one second layer has a compressive strength greater than the first layer to further distribute forces caused by the impact of a foreign body and to further resist denting or plastic deformation of the fan case liner. A backsheet may be disposed over and attached to the second honeycombed layer.

15 Claims, 3 Drawing Sheets

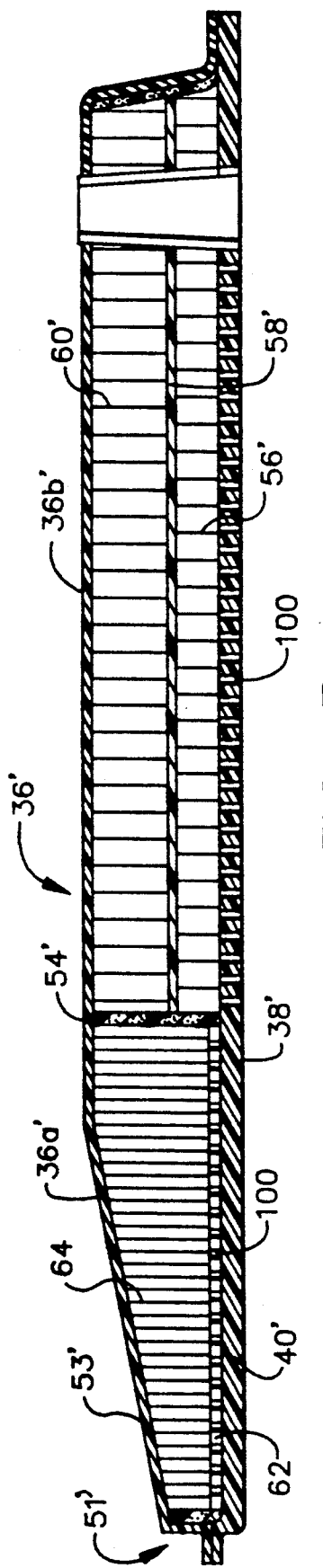
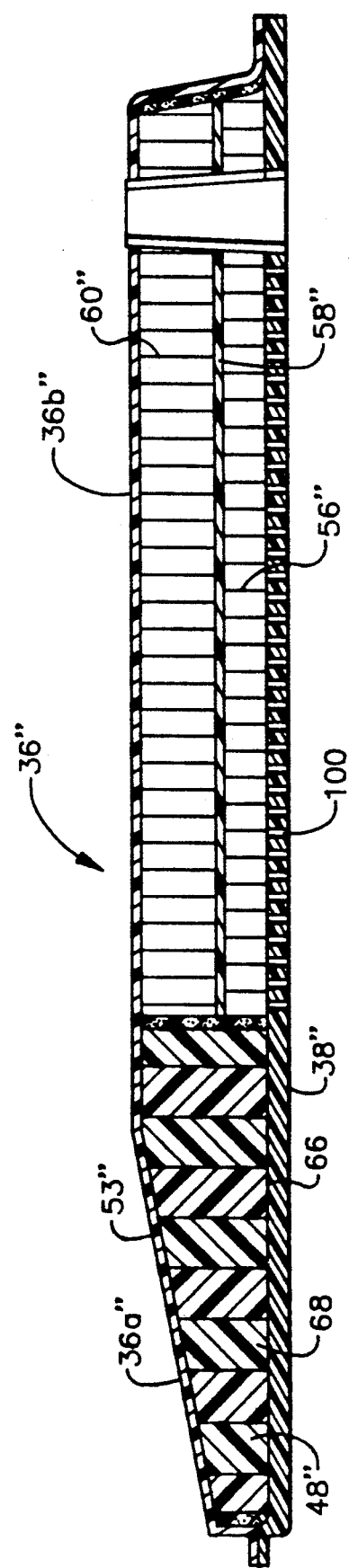

FAN CASE LINER FOR A GAS TURBINE ENGINE WITH IMPROVED FOREIGN BODY IMPACT RESISTANCE

BACKGROUND OF THE INVENTION

The present invention relates to fan case liners for gas turbine engines and more Particularly to a fan case liner having an area structured to resist damage or denting caused by the impact of a foreign body, such as ice, birds or the like, which are hurled against the fan case liner by the rotating fan of the gas turbine engine.

Large turbo-fan gas turbine engines have a liner segment mounted within the fan case of the engine immediately aft of the fan. One function of the fan case liner is the suppression of engine noise. These liner segments are preferably constructed of lightweight materials which make them highly susceptible to foreign object damage when impacted by a high velocity object accelerated by the centrifugal force of the rotating fan.

Fan case liner damage or denting can be a particular Problem during aircraft operation in cold weather or in colder climates when weather conditions are favorable for the formation of ice. Ice can form and build-up on the spinner and fan blade roots when an aircraft is in a holding pattern and the fan is rotating at a relatively low speed. When the aircraft is given clearance to leave the holding pattern, the subsequent acceleration of the engine can cause the ice to shed from the spinner and root of the fan and to be hurled into the fan case liner causing damage or denting which can adversely affect the aerodynamic performance of the bypass duct of the turbo-fan engine.

A prior modification to a fan case liner to resist foreign body impact damage included providing a solid face sheet of fiberglass or metallic material backed by a honeycombed layer of aluminum or aluminum alloy having a higher density than the honeycombed layer in conventional fan case liners. This modification, however, resulted in an unacceptable weight increase.

SUMMARY OF THE INVENTION

It is, accordingly, a primary object of the present invention to provide a novel fan case liner which is not subject to the foregoing disadvantages.

It is another object of the present invention to provide a lightweight fan case liner which is resistant to damage or denting when impacted by ice or another foreign body.

In accordance with the invention, a fan case liner for a gas turbine engine includes a foreign body impact resistant area immediately aft of the fan and a sound suppression area adjacent to and immediately aft of the foreign body impact resistant area. The foreign body impact resistant area includes a face sheet consisting of at least one layer of impact resistant material which substantially resists denting or plastic deformation when struck by a piece of ice or other foreign body. A first layer of material is disposed over and attached to the face sheet layer. This first layer is preferably a honeycombed layer of aluminum, aluminum alloy or the like having a multiplicity of hexagonally shaped voids or cells formed therein and having a selected thickness or depth and a selected compressive strength to absorb or distribute loading forces caused by the impact of a foreign body away from the foreign body impact area. In one embodiment of the present invention, each of the multiplicity of cells or voids is filled with a microballoon filler material or the like. At least one second layer of material having a chosen thickness and a chosen compressive strength greater than the selected compressive strength of the first layer is disposed over and attached to the first layer of material. The second layer of material further absorbs and distributes the loading forces caused by the impact of a foreign body and resists plastic deformation of the fan case liner. A backsheet of material is preferably disposed over and attached to the second layer of material. The backsheet may be two plies of fiberglass or the like.

In accordance with the invention, a method for making a fan case liner for a gas turbine engine which is resistant to damage caused by the impact of a foreign body includes the steps of: forming a face sheet of a first selected number of plies of fiberglass material; Forming a backsheet of a second selected number of Plies of fiberglass material; forming a first honeycombed layer made of one of aluminum, an aluminum alloy or the like. The first layer having a multiplicity of hexagonally shaped cells or voids of a selected size and wall thickness formed therein, to provide a selected compressive strength; filling each of the first honeycombed layer cells with a microballoon filler material to further increase the compressive strength of the first layer to prevent denting when impacted by a foreign body; forming a second honeycombed layer made of one of aluminum, an aluminum alloy or the like, the second honeycombed layer having a multiplicity of hexagonally shaped cells or voids of a chosen size and wall thickness formed therein, to provide a chosen compressive strength greater than the compressive strength of the first honeycombed layer; attaching the backsheet to one surface of the second honeycombed layer by a fiber reinforced adhesive; attaching an opposite surface of the second honeycombed layer to one surface of the first honeycombed layer by a fiber-reinforced adhesive; and attaching the face sheet to an opposite surface of the first honeycombed layer by a fiber-reinforced adhesive.

These and other objects of the invention, together with features and advantages thereof, will become apparent from the following detailed specification when read with the accompanying drawings in which like referenced numerals refer to like elements.

BRIEF DESCRIPTION OF THE DRAWINGS

FIG. 3 is a detailed cross-sectional view of a fan case liner in accordance with another embodiment of the present invention.

FIG. 4 is a detailed cross-sectional view of a fan case liner in accordance with a further embodiment of the present invention.

DETAILED DESCRIPTION OF THE PREFERRED EMBODIMENTS

Figure 1:
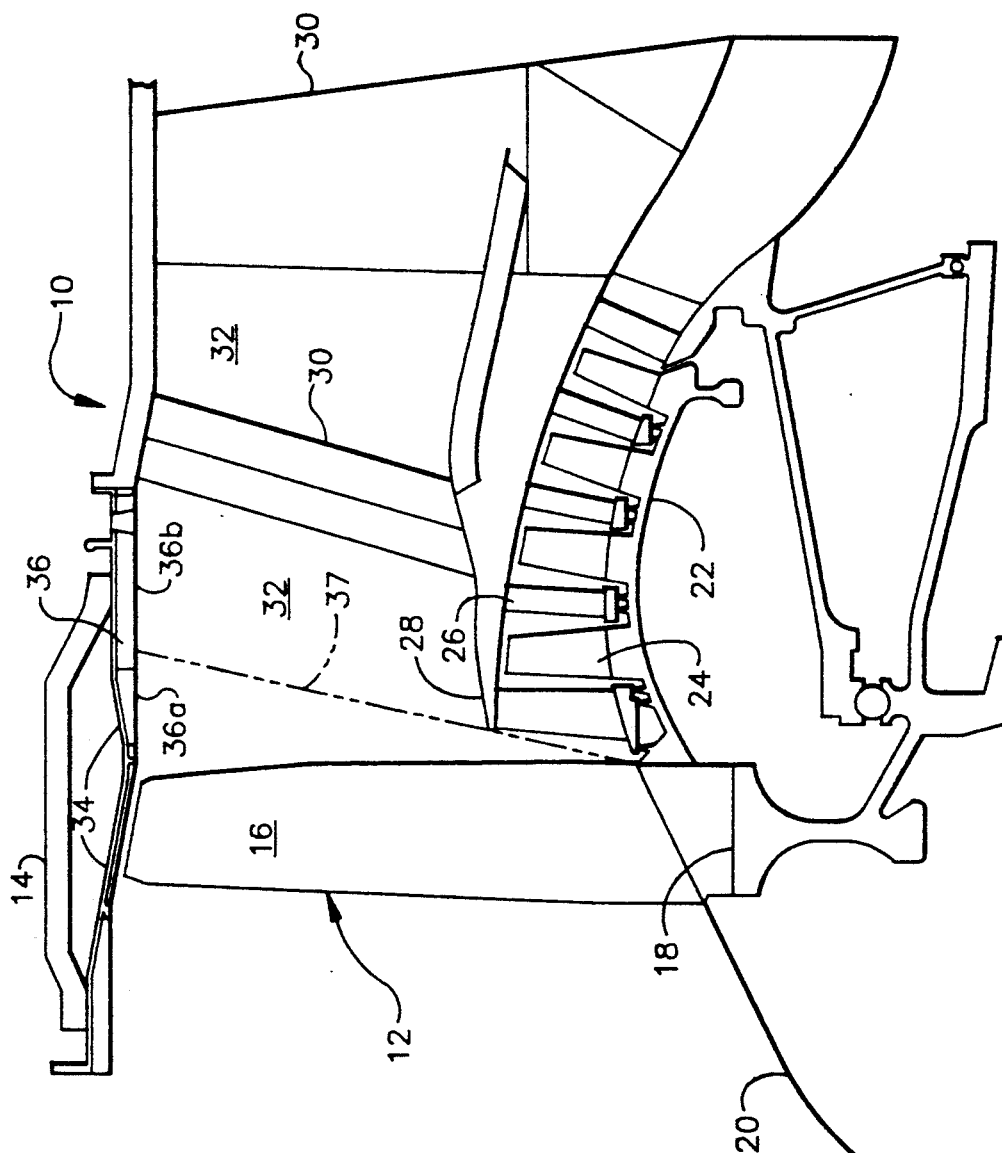
FIG. 1 is a partial cross-sectional view of a high bypass turbofan engine.

Referring initially to FIG. 1, a longitudinal partial cross-sectional view of the forward portion of a high-bypass turbofan engine 10 is shown. Engine 10 includes a conventional fan 12 disposed within a fan cowl 14. The fan includes a plurality of fan blades 16 (only one is shown in FIG. 1); fan blades 16 are connected at their respective roots 18 to a hub or spinner 20. Disposed downstream of fan 12 is a low pressure compressor (LPC) 22 which includes a series of alternately disposed rotating blades 24 and fixed vanes 26 for redirecting the airflow through LPC 22 to generate work. LPC 22 is contained within a casing 28.

Fan cowl 14 is fixedly attached to and spaced from casing 28 by a plurality of circumferentially spaced struts 30 which define therebetween an annular fan bypass duct 32.

A fan case 34 annularly surrounds fan 12 to create a tight seal between the tips of fan blades 16 and fan cowl 14. Immediately aft of fan 12, the fan case 34 is circumferentially lined with a fan case liner 36.

In accordance with the present invention, fan case liner 36 includes a foreign body impact resistant area 36a disposed immediately aft of fan 12 and a sound suppression area 36b which is disposed immediately aft of impact resistant area 36a and is integrally formed therewith.

As previously discussed, when weather conditions are conducive for the formation of ice, ice build-up can occur on spinner 20 and on blades 16 proximate to root 18 when an aircraft (not shown) is operating at a slower speed, such as in a holding pattern, and when fan 12 is rotating at a relatively low fan speed. When the aircraft is then given clearance to leave the holding pattern and the aircraft is accelerated, the subsequent acceleration of the engine can cause the ice to shed from fan 12 and spinner 20 and to impact fan case liner 36. As shown in FIG. 1, the trajectory of any ice shed from fan root 18 or spinner 20 will impact fan case liner 36 forward of broken line 37 because LPC casing 28 will effectively shield sound suppression portion 36b of fan case liner 36. Therefore, only area 36a needs to be constructed to resist damage or denting from the impact of ice or other foreign bodies hurled into fan case liner 36 by the rotation of fan 12. Broken line 37 will actually curve slightly aft because the trajectory of the ice will be curved sightly aft as a result of the forward acceleration of the engine and the flow of air forced into bypass duct 32 by fan 12.

Figure 2:
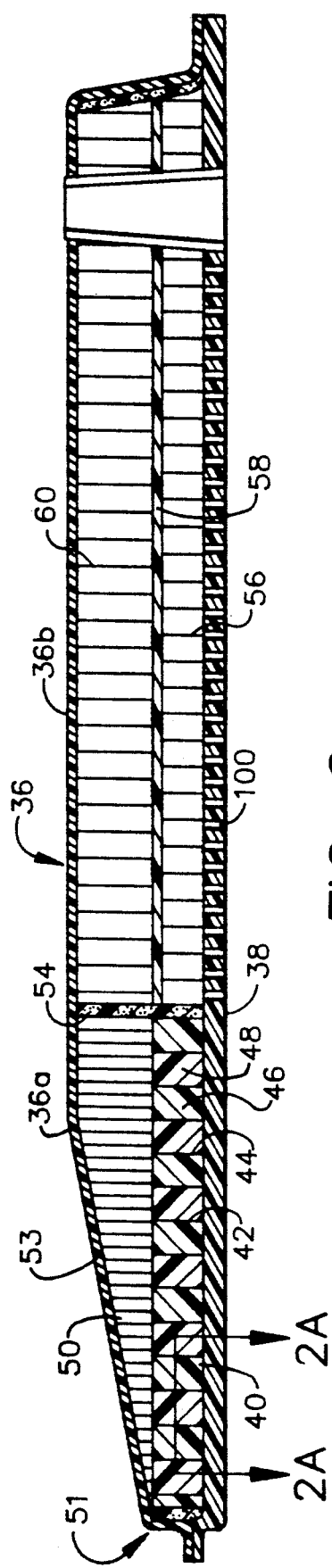
FIG. 2 is a detailed cross sectional view of a fan case liner in accordance with one embodiment of the present invention.

FIG. 2 is a detailed cross-sectional view of fan case liner 36 in accordance with a presently preferred embodiment of the present invention. Fan case liner 36 includes a face sheet 38 of impact resistant material, such as fiberglass or the like. Face sheet 38 preferably includes about six plies of fiberglass or layers of glass cloth impregnated with an epoxy resin. Face sheet 38 extends substantially completely across both areas 36a and 36b. A first honeycombed layer 40 of aluminum or aluminum alloy is disposed over a forward portion of face sheet 38 in impact resistant area 36a and is attached to the face sheet by a fiber reinforced adhesive (not shown). First honeycombed layer 40 has a thickness preferably of about 0.45" and is made from an aluminum alloy which complies with specification ASTM 5052 T. Aluminum honeycomb material of this type is known and commonly used in gas turbine engine manufacturing.

Figure 2A:
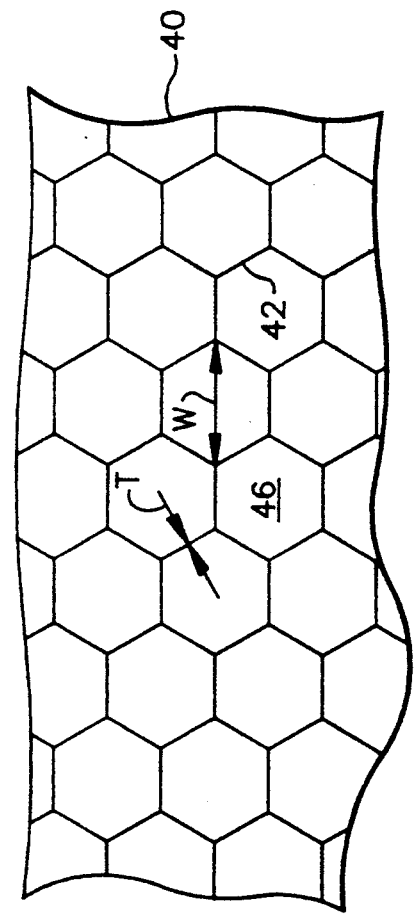
FIG. 2A is a detailed cross-sectional view of the first honeycombed layer taken along lines A—A.

A detailed cross-sectional view of first honeycombed layer 40 is shown in FIG. 2A. The honeycomb may be specified by providing a sidewall thickness "T" and a distance or width "W" between opposite angles of the hexagonal structures which make up the honeycombed layer. The compressive strength of the honeycomb is a function of the cell width W and the wall thickness T.

First layer 40 preferably has a wall thickness of about 0.002 inches and a cell width of about ⅜". The first layer should have a compressive strength of between about 200 psi and about 350 psi. A higher compressive strength would require a denser honeycombed structure and increased weight.

Each of the cells or voids 46 of first honeycombed layer 40 are filled with a filler material 48 of microballoons dispersed in a resin, such as void filling compound Specification No. EC3439 as manufactured by the 3M Company of St. Paul, Minn. Filler material 48 may also be phenolic microballoons which are disposed in an epoxy resin, or a similar filler material which is compact but light weight.

Impact resistant area 36a further includes at least a second layer 50 of honeycombed material, preferably also an aluminum alloy conforming to Specification No. ASTM 5052 T. Each hexagonal cell structure of second honeycombed layer 50 preferably has a width of about 3/16" and a wall thickness of about 0.002". Second honeycombed layer 50 should have a higher compressive strength than first layer 40 to further distribute and absorb the forces generated by the impact of a piece of ice or a foreign body; this also allows first honeycombed layer 40 to be less dense and lighter in weight. The compressive strength of second layer 50 is preferably between about 600 psi and about 1000 psi. Second honeycombed layer 50 is disposed over and attached to first layer 40 by a fiber reinforced epoxy adhesive. Second layer 50 has a thickness of about 0.58" in the vicinity of sound suppression area 36b and tapers toward the forward portion 51 of fan case liner 36.

In accordance with the invention, impact forces caused by the impact of a foreign body on liner 36, which are not completely absorbed by first layer 40, will be transferred or distributed from first layer 40 to second layer 50, because of the contact between the surfaces, and these remaining forces will then be absorbed by second layer 50 without plastic deformation of liner 36.

A backsheet 53 is disposed over and attached to second honeycombed layer 50 by a fiber reinforced epoxy adhesive and backsheet 53 extends substantially completely across both the impact resistant area 36a and sound suppression area 36b of fan case liner 36. Backsheet 53 preferably includes at least two layers of a fiberglass-like material.

Sound suppression area 36b is separated from impact resistant area 36a by a wall 54 of a foam-type adhesive conforming to General Electric Company Specification No. A50TF103 or the like. Face sheet 38 in sound suppression area 36b preferably has a multiplicity of perforations (100) formed therein to permit sound to penetrate the interior of sound suppression area 36b. The perforations may be about 0.068" in diameter with about 86 to about 90 holes or perforations per square inch. A first layer 56 of Aramid fiber reinforced honeycomb is disposed over and attached to perforated face sheet 38 by a nonreinforced epoxy adhesive. First fiber reinforced honeycomb layer 56 may be about 0.4" thick. A millipore sheet 58 is disposed over and attached to first Aramid fiber layer 58 by a nonreinforced epoxy. Millipore sheet 58 is preferably two plies of fiberglass that are perforated, preferably with a hole density greater than face sheet 38.

At least a second layer 60 of Aramid fiber reinforced honeycomb is disposed over and attached to millipore sheet 58 by a nonreinforced epoxy adhesive. As previously described, backsheet 53 extends over second Aramid honeycomb layer 60 and is attached thereto by an adhesive.

A process for making fan case liner 36 includes the step of preforming and curing fiberglass face sheet 38 and fiberglass backsheet 53. First aluminum honeycomb layer 40 and second aluminum honeycomb layer 50 are both machined or milled to their desired dimensions. First aluminum layer 40 is placed in a mold and the cells 46 are filled with microballoon/resin filler material 48. To cure the microballoon/resin filler material 48 within cells 46, a lid is attached to the mold and the mold is heated at a minimum curing temperature of about 125° F. for a predetermined time period depending upon the temperature, e.g., a higher curing temperature would require less curing time.

Backsheet 53 is placed in another mold for forming an entire segment of fan case liner 36. A fiber reinforced adhesive is applied to the exposed side of backsheet 53 and a nonreinforced adhesive is applied to both sides of second Aramid fiber layer 60. Layer 60 is heated to cause reticulation of the adhesive so that the adhesive congregates on the side edges of the honeycomb structure of second layer 60 and does not get down into the cells of the honeycomb structure; second layer 60 is then placed in the mold. Millipore sheet 58 is then disposed over second layer 60 and attached thereto by the adhesive.

Adhesive is applied to both sides of first Aramid honeycombed layer 56 and first layer 56 is heated to cause reticulation of the adhesive; first layer 56 is then placed in the mold with one face against millipore sheet 58. Second and first aluminum honeycomb layers 50 and 40 are respectively placed in the mold with fiber reinforced adhesive applied between all interfaces. Face sheet 38 is then disposed over both impact area 36a and sound suppression area 36b; face sheet 38 is attached to impact area 36a by a fiber reinforced adhesive and is attached to first layer 56 of sound suppression area 36b by the adhesive which was previously applied and reticulated. A lid is then fastened onto the mold and the structure is cured at a temperature of about 250° F. for a time period of about 60 to about 90 minutes.

Referring to FIG. 3, another embodiment of the present invention includes a perforated aluminum face sheet 62 having a thickness of about 0.08", and an aluminum honeycombed layer 64 having cells with a width of about ⅛" and a wall thickness of about 0.006". Perforated aluminum face sheet 62 preferably has perforations of about 0.08" in diameter with about 80 to about 90 holes per square inch. The prime and prime reference numerals correspond to like elements in each embodiment. Aluminum honeycomb layer 64 has a thickness of about 0.9" and tapers toward the forward portion 51 of fan case liner 36'. Layer 64 preferably has a compressive strength of about 5200 psi to distribute and absorb the forces caused by the impact of a foreign body and to resist plastic deformation of liner 36'.

The length of impact resistant area 36a or 36a' may be about 4", and the overall length of fan case liner 60 is about 12.75".

A further embodiment of the present invention is shown in FIG. 4 and includes a face sheet 38" of multiple layers of fiberglass or other high impact resistant material and a first honeycombed layer 66 of aluminum or an aluminum alloy, which is disposed over a forward portion of face sheet 38" in impact resistant area 36a". First layer 66 is attached to face sheet 38" by a layer of fiber reinforced adhesive (not shown in FIG. 4). First layer 66 preferably conforms to specification ASTM 5052 T and has a wall thickness of about 0.002" and a cell width of about ⅛". In accordance with the invention, the cells or voids 68 of first layer 66 are filled with a phenolic resin microballoon dispersed in an epoxy resin to form a filler material 48" to improve the compressive strength of layer 66. A backsheet 53" is then disposed over and attached to first layer 66 by a fiber reinforced adhesive. Sound suppression area 36b" has a structure substantially the same as sound suppression areas 36b and 36b' of the embodiments of FIGS. 2 and 3.

The structure of fan case liner 36" in FIG. 4 results in some increase in the weight of the liner relative to the embodiments of FIGS. 2 and 3 and therefore, is probably less preferred.

While the present invention has been described using a honeycomb-type structure for layers 40, 50, 56, 60, 64, 58' and 60', those skilled in the art will recognize that other types of geometric patterns could be used as well; although, the hexagonal honeycomb-type structure may prove to have the greatest structural integrity.

It will be readily understood by those skilled in the art that the present invention is not limited to the specific embodiments described and illustrated herein. Different embodiments and adaptations besides those shown herein and described as well as many variations, modifications and equivalent arrangements will now be apparent or will be reasonably suggested by the foregoing specification and drawings, without departing from the substance or scope of the invention. While the present invention has been described herein in detail in relation to its preferred embodiments, it is to be understood that this disclosure is only illustrative and exemplary of the present invention and is made merely for purposes of providing a full and enabling disclosure of the invention. Accordingly, it is intended that the invention be limited only by the spirit and scope of the claims appended hereto.

What is claimed is:

1. A fan case liner for a gas turbine engine, comprising:
   a foreign body impact resistant area, including:
   a face sheet including multiple plies of an impact resistant material which substantially resists plastic deformation when struck by a foreign body;
   a first honeycombed layer disposed over and attached to said face sheet, said first honeycombed layer being made of one of aluminum and an aluminum alloy and having a multiplicity of hexagonally shaped cells formed therein, each of said cells having a selected width and a selected wall thickness to provide a selected compressive strength to resist plastic deformation of the fan case liner;
   a microballoon filler material disposed within each of said cells of said first honeycombed layer to increase the compressive strength of said first layer and to distribute the forces caused by the impact of a foreign body to further resist plastic deformation of the fan case liner;
   at least one second honeycombed layer disposed over and attached to said first honeycombed layer, said at least one second honeycombed layer being made of one of aluminum and an aluminum alloy and having a multiplicity of hexagonally shaped cells formed therein, each of said cells having a chosen width and a chosen wall thickness to provide a compressive strength greater than said selected compressive strength of said first honeycombed layer to further distribute foreign body impact forces and to resist plastic deformation of the fan case liner; and a backsheet disposed over and attached to said at least one second honeycombed layer.

2. A fan case liner for a gas turbine engine, comprising:

a face sheet including multiple plies of an impact resistant material which substantially resists plastic deformation when struck by a foreign body;

a perforated layer disposed over and attached to said face sheet, said perforated layer being made from one of aluminum and an aluminum alloy and having a selected density of holes formed therein to provide a selected compressive strength to resist plastic deformation;

at least one honeycombed layer disposed over and attached to said perforated layer, said at least one honeycombed layer being made of one of aluminum and an aluminum alloy and having a multiplicity of hexagonally shaped cells formed therein, each of said cells having a chosen width and a chosen wall thickness to provide a compressive strength greater than said selected compressive strength of said perforated layer to distribute foreign body impact forces and resist plastic deformation of the fan case liner; and a backsheet disposed over and attached to said at least one honeycombed layer.

3. A fan case liner for a gas turbine engine, comprising:

a foreign body impact resistant area, including:

at least one layer of impact resistant material which substantially resists plastic deformation when struck by a foreign body;

a first layer of material disposed over and attached to said at least one layer and having a selected compressive strength to distribute and absorb loading forces, created by an impact of said foreign body, from a foreign body impact area; and at least one second layer of material disposed over and attached to said first layer of material and having a chosen compressive strength greater than the selected compressive strength of said first layer to further distribute and absorb foreign body impact forces and resist plastic deformation of the fan case liner.

4. The fan case liner of claim 3, wherein said first layer and said at least one second layer each respectively comprise a multiplicity of integrally formed structures, each structure being formed by a plurality of walls which each extend substantially normal to a plane parallel with said first and second layers, and adjacent structures share a common wall, said plurality of walls of each structure forming a void within each structure.

5. The fan case liner of claim 3, wherein said first layer and said at least one second layer each respectively comprise a honeycombed layer made of one of aluminum and an aluminum alloy, each of said honeycombed layers having a multiplicity of hexagonally shaped cell formed therein.

6. The fan case liner of claim 5, wherein each of said multiplicity of hexagonally shaped cells of said first layer are substantially filled with a microballoon filler material.

7. The fan case liner of claim 5, wherein each of said multiplicity of hexagonally shaped cells of said first layer have a width of about ⅛" and a wall thickness of about 0.002".

8. The fan case liner of claim 5, wherein each of said multiplicity of hexagonally shaped cells of said at least one second layer have a width of about 3/16" and a wall thickness of about 0.002".

9. The fan case liner of claim 3, further comprising a backsheet of material disposed over and attached to said at least one second layer.

10. The fan case liner of claim 3, further comprising a sound suppression area attached aft of said foreign body impact resistant area.

11. The fan case liner of claim 3, wherein said first layer of material has a compressive strength between about 200 psi and about 350 psi.

12. The fan case liner of claim 3, wherein said at least one second layer of material has a compressive strength between about 600 psi and about 1000 psi.

13. The fan case liner of claim 3, wherein said first layer of material is a perforated sheet made from at least one of aluminum and an aluminum alloy having a perforation diameter of about 0.08 inches and a perforation density between about 80 and about 90 holes per square inch.

14. The fan case liner of claim 13, wherein said at least one second layer is a honeycombed layer of one of aluminum and an aluminum alloy, said honeycombed layer having a multiplicity of hexagonally shaped cells formed therein with the width of each cell being about ⅛" and each cell wall having a thickness of about 0.006".

15. A method for making a fan case liner for a gas turbine engine, comprising the steps of:

forming a face sheet of a first selected number of plies of fiberglass material;

forming a backsheet of a second selected number of plies of fiberglass material;

forming a first honeycombed layer made of one of aluminum and an aluminum alloy, the first layer having a multiplicity of hexagonally shaped cells formed therein, each of said cells having a selected width and wall thickness to provide a selected compressive strength;

filling the first honeycombed layer cells with a microballoon filler material to further increase the compressive strength of the first layer to prevent denting when impacted by a foreign body;

forming a second honeycombed layer made of one of aluminum and an aluminum alloy, the second honeycombed layer having a multiplicity of hexagonally shaped cells formed therein, each of said cells having a chosen width and a chosen wall thickness to provide a chosen compressive strength;

attaching the backsheet to one surface of the second honeycombed layer by an adhesive;

attaching an opposite surface of the second honeycombed layer to one surface of the first honeycombed layer by an adhesive; and attaching the face sheet to an opposite surface of the first honeycombed layer by an adhesive.

* * * * *